(12) United States Patent
Burkart

(10) Patent No.: US 6,251,221 B1
(45) Date of Patent: *Jun. 26, 2001

US006251221B1

(54) PROCESS FOR PREPARING CELLULOSE FROM LIGNIN-POOR CELLULOSE-CONTAINING FEED STOCKS

(76) Inventor: Leonard Burkart, 2743 5th St. SW., Loveland, CO (US) 80537

( * ) Notice: Subject to any disclaimer, the term of this patent is extended or adjusted under 35 U.S.C. 154(b) by 0 days.

This patent is subject to a terminal disclaimer.

(21) Appl. No.: 09/227,890

(22) Filed: Jan. 11, 1999

Related U.S. Application Data

(63) Continuation of application No. 08/808,654, filed on Feb. 28, 1997, now Pat. No. 5,859,236.
(60) Provisional application No. 60/014,076, filed on Mar. 26, 1996, and provisional application No. 60/012,571, filed on Feb. 29, 1996.

(51) Int. Cl.$^7$ .............................. D21C 5/02; D21H 11/12
(52) U.S. Cl. .................................. 162/5; 162/91; 162/95; 162/96; 162/98
(58) Field of Search .................................. 162/14, 16, 91, 162/92, 97, 98, 99, 96, 4, 5; 536/56, 124

(56) References Cited

U.S. PATENT DOCUMENTS

| | | | |
|---|---|---|---|
| 3,081,218 | * | 3/1963 | Ambuehl et al. ........................ 162/19 |
| 4,826,566 | * | 5/1989 | Burkart .................................. 162/14 |
| 5,859,236 | * | 1/1999 | Burkart .................................. 536/56 |
| 5,944,953 | * | 8/1999 | Lavoie et al. ........................... 162/96 |

* cited by examiner

*Primary Examiner*—Dean T. Nguyen
(74) *Attorney, Agent, or Firm*—Glenna Hendricks

(57) ABSTRACT

The method of the invention involves treating cellulosic vegetable matter (the "Feed Stocks") for the selective recovery of lignin (when present in the feed-stock), cellulose and hemi-celluloses by: (1) reducing the material to be processed to an appropriate size; (2) adjusting the moisture content of the ligno-cellulosic feed stock to 15 percent to 30 percent water; (3) impregnating the ligno-cellulosic feed stock with an extraction liquor containing a glycol and an organic or Lewis acid; (4) rapid heating of said impregnated feed stock to a temperature of about 118° C. to about 145° C.; (5) maintaining the desired temperature for about 1 minute to about 6 minutes to solubilize the lignin therefrom (a period of about 2 minutes to about 5 minutes is preferred); (6) stopping the reaction immediately by lowering the temperature to <100° C. in a quenching bath of fresh or recycled liquor or other suitable liquid; (7) removing the lignin-enriched extraction liquor from the quenched impregnated matter and (8) recovering the extracted lignin. If the feed stock is non-ligneous (for example, cotton linters), the quenching step (step 6) may be combined with a wash (alcohol is exemplified) to remove the cooking liquor from the cooked material. The cellulosic material may then be recovered from the liquid using separatory means known in the art such as filtration, centrifugation or vacuum screening. Alcohol may be recovered by evaporation under reduced pressure.

6 Claims, No Drawings

PROCESS FOR PREPARING CELLULOSE FROM LIGNIN-POOR CELLULOSE-CONTAINING FEED STOCKS

This application is a continuation of U.S. Ser. No. 08/808,654, which was filed on Feb. 28, 1997 now U.S. Pat. No. 5,859,236 which takes priority from U.S. Provisional Applications Nos. 60/012,571, filed Feb. 29, 1996 and 60/014,076 filed Mar. 26, 1996.

FIELD OF THE INVENTION

The invention disclosed herein provides a process for extracting lignin, cellulose and hemicelluloses from lignocellulosic matter. It also provides an improved method of converting cellulose to microcrystalline cellulose by a process that gives better control over the size and uniformity of the microcrystalline particles than was previously available.

Products obtained by the extraction process of the present invention may be (1) used directly without additional processing, (2) subjected to further processing using the methods of the invention or methods known in the art, or (3) used as chemical feed stocks for further manufacturing into fuel alcohol, livestock feed molasses, adhesives, plastics and many other commercially valuable products.

Ligno-cellulosic material used as the feed stock for a process described herein can include recycled wood products such as wastepaper, paperboard, cardboard and other paper products, as well as tree limbs, broken boards, recycled wood waste, and so forth. Materials such as these are typically discarded in landfills and constitute a major portion of the Nation's landfill mass. This ever-increasing burden on the limited number of landfill sites can be greatly alleviated using methods described herein to convert agricultural, industrial and domestic trash into useful products.

BACKGROUND OF THE INVENTION

A preferred liquor for use in preparation of pulp and extraction of lignin from wood has been described in U.S. Pat. Nos. 3,442,753 and 3,522,230 to Burkart, both of which are incorporated herein by reference in their entirety.

U.S. Pat. No. 4,826,566 discloses an improved method for treating ligno-cellulosic material to remove lignin and to obtain cellulose and other valuable products from paper, chips or other forms of cellulosic materials.

SUMMARY OF THE INVENTION

The invention provides an improvement over the prior art methods disclosed and claimed in U.S. Pat. No. 4,826,566 resulting from manipulating reaction parameters such as the water content of the feed stock, the temperature at which the reaction takes place and the length of time the material is allowed to react with the extraction liquor. Control of the time of reaction is improved by the incorporation of a quenching step into the extraction process.

The method of the invention involves treating cellulosic vegetable matter (the "Feed Stocks") for the selective recovery of lignin (when present in the feed-stock), cellulose and hemicelluloses by: (1) reducing the material to be processed to an appropriate size; (2) adjusting the moisture content of the ligno-cellulosic feed stock to 15 percent to 30 percent water; (3) impregnating the ligno-cellulosic feed stock with an extraction liquor containing a glycol and an organic or Lewis acid; (4) rapid heating of said impregnated feed stock to a temperature of about 118° C. to about 145° C.; (5) maintaining the desired temperature for about 1 minute to about 6 minutes to solubilize the lignin therefrom (a period of about 2 minutes to about 5 minutes is preferred); (6) stopping the reaction immediately by lowering the temperature to <100° C. in a quenching bath of fresh or recycled liquor or other suitable liquid; (7) removing the lignin-enriched extraction liquor from the quenched impregnated matter and (8) recovering the extracted lignin. If the feed stock is non-ligneous (for example, cotton linters), the quenching step (step 6) may be combined with a wash (alcohol is exemplified) to remove the cooking liquor from the cooked material. The cellulosic material may then be recovered from the liquid using separatory means known in the art such as filtration, centrifugation or vacuum screening. Alcohol may be recovered by evaporation under reduced pressure. An improved means of converting the cellulose fraction to microcrystalline cellulose employs using ultrasonic means.

The triethyleneglycol solvent system described is easily adapted with modification to maximize the commercial usefulness of enormous quantities of cellulosic waste materials such as waste paper, poor quality or damaged cotton bales, used lumber, tree limbs, agricultural wastes, and so forth. The temperature at which the ligno-cellulosic material impregnated with liquor is heated is important for control of the process. Temperatures of about 118° C. to about 145° C. (a more preferred range being from 119° C. to 138° C.) are particularly appropriate for the recovery of products from pulped waste paper and wood.

The liquor dissolves the lignin leaving the residual carbohydrates in high yield. Liquor and lignin remaining in the pulp can be removed by washing the pulp with an alcohol such as ethanol followed by draining or centrifugation. The washing material such as ethanol may then be reclaimed by evaporation from the liquid under reduced pressure. Lignin can be reclaimed from the liquor by precipitation with water as disclosed herein. The extraction liquor can be recovered from the water/extraction liquor mix by evaporation of water at reduced pressure and recycled.

Microcrystalline cellulose can be produced either from the lignin-depleted pulp or from material which does not naturally contain lignin, such as cotton linters. In this embodiment, lignin-deficient or lignin depleted cellulosic material is impregnated with extraction liquor and cooked at about 135° C. to about 145° C. (a more preferred range being 139° C. to 145° C). This hydrolyses some of the amorphous areas of the cell wall microfibrils permitting reduction to micro-crystalline size by mild mechanical or ultrasound agitation. Ultrasound is a preferred method for use in this process.

DETAILED DESCRIPTION OF THE INVENTION

Using the process of the invention, lignin and other non-carbohydrate materials (such as ink in waste paper) are dissolved into the cooking liquor with very little degradation of the cellulose and hemicelluloses. The cooking time (which will vary with the species and particle size of the feed stock) is controlled by controlling the speed of the conveyor belt. During the digestion process, the particles and more dense the species of feed stock, the longer the time needed for cooking. Rapid cooling or quenching is necessary to prevent over-cooking which causes formation of undesired degradation products and reduction in pulp yields. The lignin-depleted paper or wood pulp that remains after lignin has been extracted into the liquor may then be processed to recover cellulosic and hemicellulosic materials. The lignin is reclaimed from the liquor as described above.

Materials that do not naturally contain lignin or which, by the methods described herein or elsewhere, have become depleted of their lignin content, are acceptable substrates for the production of microcrystalline cellulose for further processing into organic chemicals or alternate fuels A common source of naturally a-ligneous material is cotton linters or low grad cotton of a quality unsuitable for manufacture.

The following illustrative examples are provided not as limitations but as a means to teach specific methods for practicing the invention in greater detail.

MATERIALS AND METHODS

The liquor used in the process described below is prepared by mixing triethyleneglycol (TEG) with about 0.5 percent to about 1.5 percent (v/v) of an organic acid or Lewis acid as described in earlier patents. An appropriate acid is para-toluenesulfonic acid. After mixing the TEG and acid, the mixture is allowed to stand about 24 hours at room temperature before being applied to cellulosic materials. However, this reaction time may be shortened if the liquor is heated. For example, if the TEG/acid mix is heated to a temperature in the range of about 125° C. to about 135° C., the liquor can be used about an hour after mixing has occurred. After the cellulosic material has been impregnated, excess liquor can be removed by draining, pressure, or centrifugation of the impregnated material.

EXAMPLE 1

Extraction of Lignin From Lignin Containing Waste Paper [Feed Stocks].

Waste from paper products such as newspapers, bonded paper, and paper board are hydrated and agitated in a hydropulper to reduce the materials to individual fibers. The hydropulpated matter is centrifuged or passed over a suction box to reduce the water content and then dried to a moisture content of about to 15 to 30 percent. The matter is then impregnated for 2 to 3 minutes at atmospheric pressure with an extraction liquor composed of triethyleneglycol (TEG)/1% paratoluenesulfonic acid prepared as described above. Excess extraction liquor is removed at this stage in the process. Said impregnated matter is metered onto a variable speed conveyor belt which passes said impregnated matter through a rf or microwave heated digester. The digester rapidly heats said impregnated matter to a temperature of 140° C. to 145° C. for 2 to 3 minutes. The extraction process is stopped by doctoring (removing) said impregnated matter from the conveyor belt into a quenching bath of alcohol to quickly reduce the temperature of said impregnated matter to less than 100° C. The quenching alcohol is recovered from the quenched liquor-impregnated matter by evaporating the alcohol under reduced pressure. Dissolved lignin is recovered from the extraction liquor by precipitation with 1.0 to 1.5 volumes of water. Precipitated lignin can be removed by centrifugation or filtration, washed and spray dried at temperatures less than 100° C. The carbohydrate pulp is recovered and processed into useful products.

EXAMPLE 2

Extraction of Lignin From Lignin Containing Wood Waste [Feed Stocks].

The wood waste (broken boards, tree limbs and other unprocessed wood material) is reduced by mechanical means to 0.25 inches or less in diameter. The wood is equilibrated to a water content of 15–20 percent and impregnated under 20 to 25 lbs. pressure with the TEG/acid extraction liquor (prepared as described above). Excess extraction liquor is removed at this stage in the process. Said impregnated matter is metered onto a variable speed conveyor belt and passed through a rf or microwave heated digester. The digester rapidly heats said impregnated matter to a temperature of 140° C. to 145° C. for 4 to 5 minutes. The impregnated matter is doctored from the conveyor belt into a quench bath of alcohol that reduces the temperature of said impregnated matter and stops cooking. Alcohol is recovered from the quenching alcohol-extraction liquor mixture by evaporation under reduced pressure. Lignin is recovered from the lignin-rich extraction liquor by precipitation with about 1.0 to 1.5 volumes of water. Water is removed from the extraction liquor by evaporation at reduced pressure and the extraction liquor can be reused. Precipitated lignin can be recovered by centrifugation or filtration. The carbohydrate pulp is recovered and processed further into useful products.

EXAMPLE 3

Extraction of Cellulose From Lignin-poor Cellulosic Materials.

The raw material (lignin-depleted waste) is washed and equilibrated to a moisture content of 20 to 25 percent water. The raw material is impregnated with the TEG/acid extraction liquor (prepared as described above). After removal of excess extraction liquor, the impregnated matter is metered onto a variable speed conveyor belt and run through a series of press rollers which compress the material to uniform thickness. The conveyor belt transports said impregnated material to a rf or microwave heated digester where said impregnated matter is rapidly heated to 135° C. to 145° C. for 2 to 4 minutes, then quenched. The pulped material is removed from the extraction liquor by vacuum filtration on rotating screens or by centrifugation. The pulp can be further processed by washing with hot water or slightly alkaline warm water to dissolve included hemicelluloses. The wash containing the hemicelluloses, which are a mixture of five and six carbon sugar polymers, can be concentrated into a molasses for livestock feed or converted into monomers by dilute acid hydrolysis or enzymatic hydrolysis. The cellulose can be processed further into useful products.

EXAMPLE 4

Preparation of Microcrystalline Cellulose from Non-ligneous Cellulosic Material.

Low quality cotton bales are washed in warm water and equilibrated to a moisture content of 15 to 25 percent water. The raw material is impregnated with the TEG/acid extraction liquor (prepared as described above). After removal of excess extraction liquor, said impregnated matter is metered onto a variable speed conveyor belt and run through a series of press rollers to compress the material to a uniform thickness. The conveyor belt transports said impregnated matter to a rf or microwave heated digester which rapidly heats said impregnated matter to 135° C. to 145° C. for 2 to 4 minutes. The resulting cooked pulp is quenched with a liquid to a temperature below 100° C. In this case, the quench tank is equipped with a mechanical agitator or with an ultra-sound generator to reduce the pulp to microcrystalline size. Ultrasound is a preferred method.

A non-obvious improvement of the current invention is the use of ultrasonic agitation. Ultrasonic agitation has been shown to produce microcrystalline cellulose of more uniform size as compared to the microcrystals produced by mechanical agitation such as by use of a hydropulper. The liquor is washed from the pulp as described above. The pulp is washed in hot water and the microcrystalline cellulose in a slurry may be pumped directly through classification screens or dried and processed for use.

EXAMPLE 5

Preparation of Microcrystalline Cellulose From Cotton Linters.

Cotton linters are washed in warm water and dried to a moisture content of 15% to 30% The linters are then treated with TEG/acid liquor and processed by the method disclosed in Example 4. After removal of excess liquor, the impregnated material is metered to the conveyor belt and transported through the microwave digester where it is heated to 135° C. to 145° C., then exposed to quenching and processing in accord with the method of Example 4.

Because the cotton contains no lignin or hemicelluloses, the quenching step removes only cooking liquor. Pulps from ligno-cellulosic feed stocks (from which the lignin and liquor have been removed) contain both cellulose and hemicelluloses. Such pulp is further purified by washing with hot water or slightly alkaline warm water to remove the hemicelluloses. The purified cellulose in microcrystalline form is then filtered or centrifuged off, washed again in warm water and dried. If the microcrystalline cellulose is to be hydrolyzed to glucose for production of alternate fuel or industrial grade alcohol, there is no need to dry the cellulose. The cellulose slurry can be pumped directly to the processor for hydrolysis by standard enzymatic or acid means.

The wash containing the hemicelluloses which are a mixture of five and six carbon sugar polymers can be either concentrated down to a molasses for livestock feed or further processed into its monomer constituents.

The above examples are provided for illustrative purposes and are not intended as limitations on the practice of the method. As shown above, several parameters of the process are adjusted depending on the particular composition of each feed stock and upon the target product. For instance, if the feed stock of Example 1 contains paper manufactured from finely processed wood pulp, a shorter time for impregnation and extraction may be used. Conversely, a feed stock containing coarse wood waste that is harder to solubilize than feed stocks such as paper or cotton linters may need longer impregnation and extraction times. The most appropriate temperature of extraction for a particular feed stock may vary from the temperature given in the examples above.

The preferred method for impregnating most lignin-free or lignin-poor feed stocks is a range of about 2 minutes to about 5 minutes at atmospheric or elevated pressure. The preferred temperature for extraction from such feed stocks is a range of about 135° C. to about 145° C. which is maintained for about 2 minutes to about 4 minutes.

The quenching step can be performed by exposure to used liquor or other suitable cool organic liquid. The method of exposure to the quenching liquid is by immersion, spraying or any other suitable method of application. A preferred method is by immersion in a tank equipped with mechanical or ultrasound agitation devices. The use of alcohol is exemplified, but is not definitive, in that other liquids may be suitable for use in the quenching step. The rapid cooling is necessary to prevent formation of undesired degradation products.

The extraction liquor can be recycled for re-use for about 5 to 10 times, depending on the lignin content of the feed stock before the lignin is precipitated out and the liquor reclaimed. (See Examples 3 and 4 above.)

The dried lignin end product of Examples 1 and 2 can be used in other manufacturing processes. Lignin precipitated by this process is readily soluble in ethanol or lower boiling solvents. Preliminary laboratory tests have shown that impregnating wood products with a solution of lignin will not only reduce shrinking and swelling, but will also inhibit rot caused by fungal growth. Since lignin is a natural product which is odorless, non-toxic to humans, and insoluble in water, there should be no EPA restriction on using lignin-impregnated wood products in residential or public buildings. The lignin product obtained from the practice of the processes of the invention is of excellent quality and will condense with aldehydes for use in production of adhesives and plastics.

What is claimed is:

1. A process for preparing cellulose from lignin-poor cellulose-containing feed stocks comprising the steps of:

1) washing and rinsing the feed stocks in hot water,
2) removing excess water from the product of step 1 to attain a water content of about 15 percent to about 30 percent water,
3) impregnating the product of step 2 with an extraction liquor that is the reaction product obtained by reacting a glycol with an organic or Lewis acid,
4) metering said impregnated product of step 3 onto a conveyor belt,
5) compressing said impregnated product of step 4 to a uniform thickness,
6) heating said impregnated product of step 5 to a temperature of about 118° C. to about 145° C.,
7) maintaining said impregnated product of step 6 at said temperature of about 118° C. to about 145° C. for about 1 minute to about 6 minutes,
8) separating the liquor from the product of step 7.

2. The process of claim 1 wherein the feed stock is cotton linters.

3. The process of claim 1 wherein the removal of water is achieved by centrifugation, suction or gravity drainage.

4. The process of claim 1 wherein the water content of the feed stock as prepared in step 2 is about 20 percent to about 25 percent.

5. The process of claim 1 wherein the heating of the impregnated mixture to a temperature of about 118° C. to about 145° C. is by radio waves.

6. The process of claim 1 wherein in step 6 said liquor-impregnated matter is heated to about 135° C. to about 145° C.

* * * * *